Patented June 18, 1935

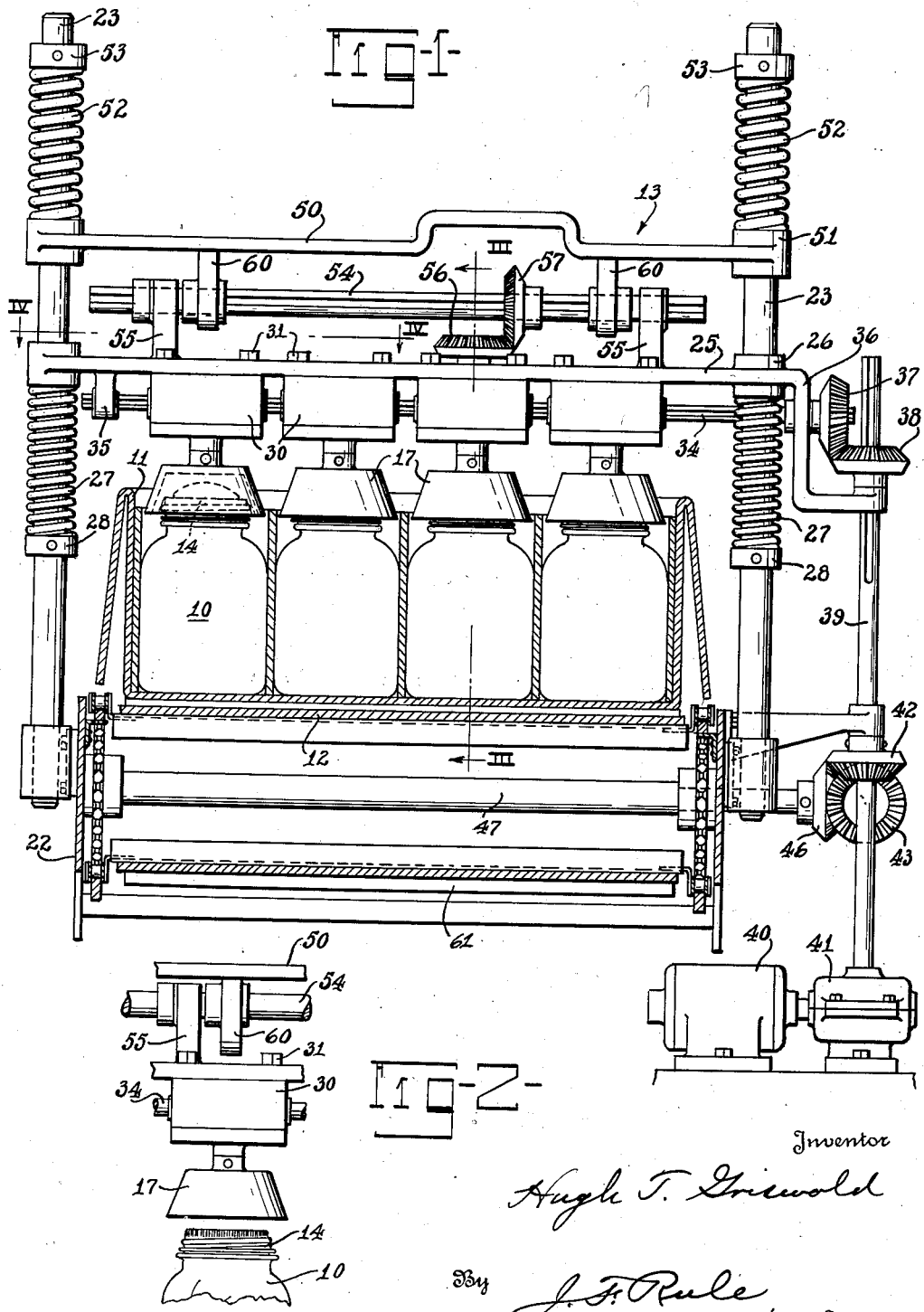

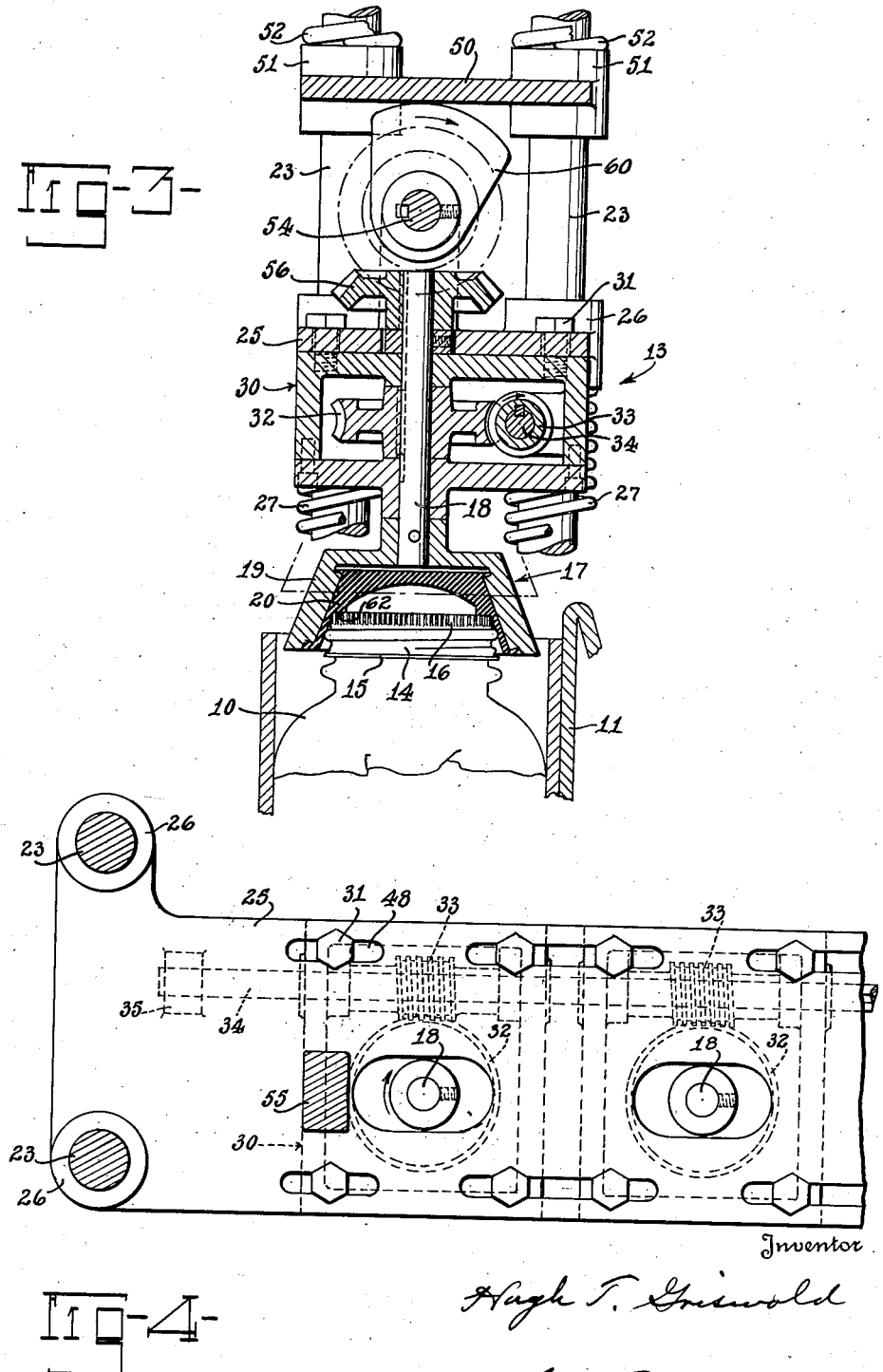

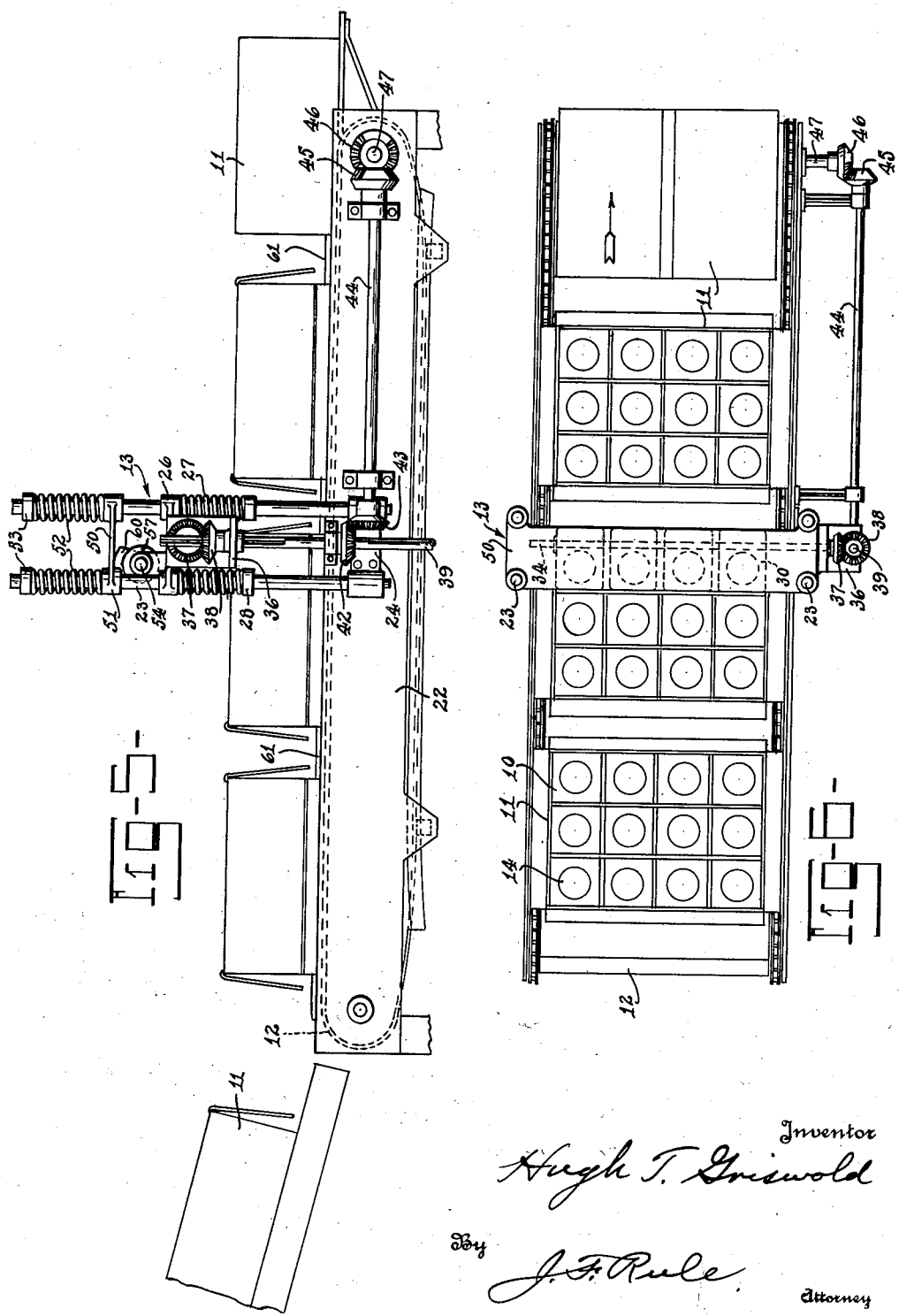

2,005,186

UNITED STATES PATENT OFFICE 2,005,186

APPARATUS FOR TIGHTENING CAPS ON JARS

Hugh T. Griswold, Toledo, Ohio, assignor to Owens-Illinois Glass Company, a corporation of Ohio Application December 30, 1933, Serial No. 704,770

7 Claims. (Cl. 226—88)

My invention relates to a novel method and apparatus for screwing or tightening caps or closure devices on bottles, jars or other containers. The invention, in its preferred form, is adapted for giving a final turn to screw caps or other forms of caps or closures which have been previously placed on the containers.

The invention may be used for example, for tightening caps on jars or the like which have been placed in cartons and vacuumized by a process which automatically effects sealing engagement of the caps with the jars before said caps have been screwed tightly and permanently on to the jars. After the jars are removed from the vacuum chamber, it is desirable to give the caps a final turn by which they are tightened and securely held against accidental loosening. The cap is thus held in sealing contact with the jar independently of the vacuum which is not always permanent. An object of the present invention is to provide a simple and practical means for effecting this final tightening of the caps in a reliable and efficient manner and without injury to the caps.

A further object of the invention is to provide a novel chuck for tightening the screw caps which will effectively grip the caps and turn them tightly onto the containers and then slip or turn relatively to the caps without scratching or mutilating the caps and without applying an excessive turning force thereto and which, moreover, can be relied on to operate uniformly on successive caps, tightening them to the same degree.

The usual methods of tightening caps on jars or the like comprise the use of a chuck of metal or other hard material which grips the flange or skirt portion of the cap. In order to securely hold the cap so as to prevent slipping during the operation of tightening the cap, considerable gripping pressure is required, which frequently results in distortion or mutilation of the cap. Moreover, when the cap has been tightened, any continued rotation of the chuck so that the latter slips on the cap, results in scratching and marring the surface of the cap or any surface coating or decoration thereon. Furthermore, with such gripping devices, it is difficult or impossible to obtain a uniform gripping force operating in such manner that the caps will all be tightened to the same extent. Any excessive turning force applied to a cap is objectionable, often resulting in breakage of the container. Where the chucks are formed to have an interlocking connection with the cap, it is difficult to obtain uniformity in the amount of turning force applied to successive caps and to avoid an excessive force being applied to the cap. An object of the present invention is to overcome these difficulties and objections by providing a chuck having cap engaging means of a soft yielding nature which will effectually prevent mutilation, distortion, scratching or marring of the cap and which will apply a uniform turning force to each cap and which is free from any surfaces or means which will interlock with the cap so as to prevent slippage when the cap has been tightened to the required degree.

A further object of the invention is to provide a chuck and operating means therefor by which a top pressure is applied to the cap during the tightening operation in a manner to materially reduce the frictional resistance to the turning movement of the cap so that tightening of the cap on the container is effected by a comparatively small turning force.

A further object of the invention is to provide a practical apparatus for automatically tightening caps on jars which have been packed in cartons or containers and while the containers are being conveyed from one point to another as by means of an endless conveyor.

Other objects of the invention will appear hereinafter.

Referring to the accompanying drawings:

Fig. 1 is a sectional elevation of an apparatus constructed in accordance with my invention.

Fig. 2 is a detail view showing a chuck in its elevated position.

Fig. 3 is a sectional elevation showing a chuck and its operating mechanism, the section being taken at the line III—III on Fig. 1.

Fig. 4 is a sectional plan view at the line IV—IV on Fig. 1.

Fig. 5 is a side elevation of the apparatus.

Fig. 6 is a plan view of the same.

As shown on the drawings receptacles 10 such as jars or bottles, are packed in cartons or contains 11, which are placed on an endless conveyor 12 and carried thereby in succession past the cap tightening apparatus 13. The caps 14, as herein shown, are screw threaded metal caps which fit the correspondingly threaded necks of the jars 10. Sealing gaskets 15 are interposed as usual between the lower margin of the cap and the opposite surface of the jar. The caps may be provided above the screw threads with an annular knurled or roughened portion 16.

The caps are tightened by means of chucks 17, which as shown in Fig. 3 are carried on rotating spindles 18. Each chuck comprises a cup shaped holder 19 keyed to the spindle, and a work-piece engaging member 20, in the form of a hollow block or cup removably held within the holder 19. The cup 20, which forms a gripping member for frictionally engaging and turning the work-piece (herein shown as a jar cap), is made of rubber, vulcanized rubber, a rubber composition or composition consisting mainly of rubber, or other soft and elastic or compressible material, which will readily grip the bottle cap and hold it frictionally for tightly screwing it onto the jar or container. At the same time the soft, elastic nature of the material permits the chuck to slip when the cap has been tightly screwed into position, without scratching, mutilating or deforming the cap and without applying an excessive turning force to the cap.

The cap tightening apparatus is mounted on the side members 22 of the belt conveyor frame. Said apparatus comprises a pair of standards 23 on each side of the conveyor frame, said standards being in the form of vertical posts or shafts having their lower ends secured in bearing brackets 24, secured to the frame members 22. A battery of chucks 17, is carried on a supporting plate 25, mounted for up and down movement on the standards 23, said plate extending transversely of the conveyor therebeneath. Plate 25 is provided with bearing sleeves 26 through which the posts 23 extend. Coil springs 27 are mounted on the posts and provide a yielding support for the carrier plate 25. The lower ends of said springs bear against stop collars 28 keyed to the posts.

The chuck spindles 18 (Fig. 3) are journaled in gear boxes 30 attached as by means of bolts 31 to the under surface of the carrier plate 25. Within each gear box is a worm gear 32, running in mesh with a worm 33 on a horizontal shaft 34 which extends through the gear boxes. The shaft 34 is journaled at one end in a hanger 35 on the plate 25 and at its opposite end in a vertical extension 36 of the plate 25. Intermeshing beveled gears 37 and 38 are mounted respectively on the shaft 34 and a vertical drive shaft 39. The shaft 39 is continuously driven as by means of an electric motor 40, having driving connection with the shaft through speed reduction gearing contained within a gear box 41, so that the chucks are driven continuously.

The drive shaft 39 also has a driving connection with the conveyor 12 through gearing comprising a beveled gear 42 on the drive shaft running in mesh with a beveled gear 43 on one end of a horizontal shaft 44 supported on the conveyor frame, the other end of the shaft 44 carrying a mutilated gear 45 which meshes with a mutilated gear 46 on the driving shaft 47 of the conveyor 12. The continuous rotation of the shaft 44 operates through the mutilated gears 45 and 46 to impart a step by step or intermittent movement to the conveyor. The rows of jars 10 extending across the conveyor are thus brought in succession to a position directly beneath the battery of chucks 17 and held stationary in such position while the chucks operate to tighten the caps, as more fully hereinafter set forth.

By reference to Fig. 4 it will be seen that the plate 25 is formed with elongated slots 48 through which the bolts 31 extend thereby permitting the gear boxes 30 and the chucks 17 to be adjusted in a direction transversely of the conveyor to accommodate the chucks to different positions or arrangements of the jars. The worms 33 may likewise be adjusted lengthwise of the shaft 34 to correspond to adjustments of the chucks.

Up and down movement is imparted to the battery of chucks by means of cam operated mechanism including a cam operated plate 50 positioned above and parallel with the carrier plate 25. The plate 50 is mounted by means of bearing sleeves 51 for up and down movement on the posts 23. Coil springs 52 are mounted on said posts above the plate 50, being held between the bearings 51 and collars 53 keyed to the upper ends of the posts. A horizontal cam shaft 54 is positioned between the plates 25 and 50, being journaled in bearings 55 on the plate 25. One of the chuck spindles 18 (Fig. 3) is extended upwardly above its gear box 30 and carries at its upper end a beveled gear 56 which meshes with a gear 57 splined on the shaft 54. The shaft 54 carries a pair of cams 60, which during each rotation of the cam shaft engage the cam plate 50 and force the carrier plate 25 and the chucks downward, compressing the springs 27. As the high portions of the cam pass beyond the plate 50 the springs 27 operate to lift the chucks to their retracted position. The springs 52 serve to hold the chucks with a yielding pressure in their lowered positions and prevent excessive pressure on said caps. The springs 52 are considerably stiffer and heavier than the springs 27 so that the spreading movement between the plates 25 and 50, due to the operation of the cams 60, is mainly a downward movement of the plate 25 causing compression of the springs 27. More or less compression of the upper springs 52 may take place during the final spreading movement between the plates 25 and 50 after the chucks are seated on the caps.

The cartons 11 are positively held in position on the conveyor by spacing strips 61 (Fig. 5). These strips may be of such width that the adjoining rows of jars on opposite sides of a spacing strip, as shown in Fig. 6, are spaced apart at double the distance between adjoining rows in the cartons. With this arrangement two step movements on the conveyor serve to advance the cartons from a position in which the battery of chucks is directly over the last row of jars in one carton, to a position in which the chucks are directly over the first row of jars in the next succeeding carton.

*Operation*

The operation may be described as follows:

The motor 40 rotates the driving shaft 39 continuously and operates through the mutilated gears 45, 46 (Fig. 5) as above described to impart a step by step movement to the conveyor. Each step movement advances the cartons 11 the distance between adjoining transverse rows of jars 10 therein, so that when the conveyor is arrested, a row of jars is directly beneath the battery of chucks 17. The chucks are rotating continuously. Up and down movement is imparted to the battery of chucks by means of the cams 60 as heretofore described. The parts are so proportioned and timed that when a row of jars is moved to a position beneath the chucks, the latter are in their elevated position as shown in Fig. 2, so as not to interfere with the positioning of the jars therebeneath. The cams 60 are at this time in their lowered position so that the springs 27 can hold the battery of chucks elevated. While the jars are in position beneath the chucks, the continued movement of the cam shaft causes the cams 60 to engage the cam plate 50 and apply an upward pressure thereto. This reacts to force the carrier plate 25 and chucks downward to operative position in which the chucks are seated on the jar caps as shown in Fig. 3.

The cup or gripping element 20 of each chuck, as shown is formed with a horizontally disposed annular ledge 62 providing a flat annular gripping surface which seats on the top surface of the cap along the marginal portion thereof. The inclined walls of the chuck extending below this ledge may also frictionally engage the threaded flange portion or skirt of the cap so that the chuck is held in frictional, gripping engagement with the top and skirt portions of the cap. When the rotating chuck is thus seated on the cap 14, it applies a turning force to the cap by which the latter is screwed tightly into sealing position on the jar, the turning force being applied mainly if not entirely to the top surface of the cap. It will be noted that the downward pressure of the chuck on the cap tends to compress the sealing gasket 15 and by counteracting the upward pressure of said gasket, reduces the friction pressure between the screw threads of the cap and those of the jar, so that the resistance to the turning movement of the cap is materially reduced. This facilitates the tightening of the cap.

The chucks bear with a yielding pressure on the cap transmitted thereto from the springs 52. The compressible yielding nature of the cup 20 also insures a yielding pressure on the cap. When the cap has been tightened by the rotation of the chuck, the latter is permitted to slip on the cap, owing to the soft resilient nature of the gripping device 20, thus avoiding excessive strain on the cap and also preventing the latter from being marred, scratched or deformed in the manner characteristic of cap tightening operations with chucks which are of a hard, unyielding nature.

The resilient material 20 also insures a uniform and reliable turning force being transmitted to the cap. The tightening of the caps takes place while the high portion of the cam is in engagement with the cam plate 50. As this high part of the cam passes beyond the plate 50 during its continued rotation the chucks are lifted by the springs 27 so as to clear the jars and their containers 11. The conveyor 12 now moves forward another step and the cycle of operations is repeated.

Modifications may be resorted to within the spirit and scope of my invention.

I claim:

1. In apparatus for tightening caps on jars or other containers, the combination of a horizontally disposed conveyor, means for supporting the containers thereon with the containers arranged in rows extending transversely of the conveyor, a battery of chucks spaced above the conveyor and arranged in a row extending transversely of the conveyor, means for intermittently driving the conveyor and thereby bringing said rows of containers in succession to an operative position beneath the battery of chucks and temporarily holding the containers at rest in said operative position, means for continuously rotating the chucks about vertical axes, a supporting plate on which the chucks are mounted, a cam shaft mounted on and spaced above said plate, cams on said shaft, a second plate positioned above the cams, means for rotating the cam shaft and cams and causing the latter to engage said second plate and thereby force the cam shaft downward, causing it to lower the chucks into engagement with the caps, springs for holding said second plate with a yielding pressure against the cams and thereby holding the chucks with a yielding pressure against the caps, and springs for lifting the chucks when released from the control of the cams.

2. Apparatus for screwing caps on containers comprising, in combination, a battery of chucks, means for rotating the chucks about vertical axes, a supporting plate on which the chucks are mounted, a cam shaft mounted on and spaced above said plate, a cam on said shaft, a second plate positioned above the cam, means for rotating the cam shaft and cam and causing the latter to engage said second plate and force the cam shaft downward and thereby lower the chucks to an operative position, and means for holding said second plate with a yielding downward pressure against the cam and thereby holding the chucks with a yielding pressure against the caps.

3. Apparatus for screwing caps on containers comprising, in combination, a battery of chucks, means for rotating the chucks about vertical axes, a supporting plate on which the chucks are mounted, a cam shaft mounted on and spaced above said plate, a cam on said shaft, a second plate positioned above the cam, means for rotating the cam shaft and cam and causing the latter to engage said second plate and force the cam shaft downward and thereby lower the chucks to an operative position, means for holding said second plate with a yielding downward pressure against the cam and thereby holding the chucks with a yielding pressure against the caps, and springs arranged to apply an upward pressure on said supporting plate for lifting the chucks when released from the control of the cam, said upward pressure being less than said downward pressure.

4. Apparatus for screwing caps on containers comprising, in combination, a battery of chucks, a supporting plate on which the chucks are mounted, a cam shaft mounted on and spaced above said plate, a cam on said shaft, a second plate positioned above the cam, means for rotating the cam shaft and cam and causing the latter to engage said second plate and force the cam shaft downward and thereby lower the chucks, conveying means for bringing rows of containers into operative position beneath the chucks, said conveying means comprising a conveyor, interconnected mechanism between said cam shaft and conveyor for intermittently advancing the conveyor in timed relation to the rotation of the cam and causing a row of containers thereon to be held stationary in operative position beneath the chucks while the latter are lowered, means for rotating the chucks while in their lowered position and thereby causing them to screw the caps on the containers, and means for holding said second plate with a yielding pressure against the cam and thereby holding the chucks with a yielding pressure against the caps.

5. Apparatus for securing caps on containers, comprising a chuck, a supporting member carrying the chuck, a cam mounted on said supporting member, means for rotating the cam, a second member positioned to be engaged by the cam and reacting through said cam and supporting member to move the latter and thereby move the chuck bodily to an operative position in which it applies pressure to a cap and the container on which the cap is placed, means for rotating the chuck and thereby rotating the cap into position on the container, and means for holding said second member with a yielding pressure against the cam so that the chuck is held with a yielding pressure against the cap.

6. Apparatus for securing caps on containers, comprising a chuck, a supporting member carrying the chuck, a cam mounted on said supporting member, means for rotating the cam, a second member positioned to be engaged by the cam and reacting through said cam and supporting member to move the latter and thereby move the chuck bodily to an operative position in which it applies pressure to a cap and the container on which the cap is placed, means for rotating the chuck and thereby rotating the cap into position on the container, means for holding said second member with a yielding pressure against the cam so that the chuck is held with a yielding pressure against the cap, and means for applying a spring pressure to said supporting member in a direction to move the latter and said chuck away from the container when released from the control of the cam.

7. Apparatus for screwing caps on containers, comprising horizontally disposed plates spaced one above the other, vertical standards on which said plates are mounted and guided for up and down movement, a cam shaft interposed between said plates and carried on the lower plate, cams on said shaft, a battery of chucks mounted on the lower plate, means for rotating the chucks, means for rotating the cam shaft and cams and thereby causing the latter to intermittently engage the upper plate and react to force the lower plate downward, thereby lowering the chucks to operative position, means for positioning rows of containers with caps thereon beneath the chucks, coil springs mounted on said standards beneath the lower plate and applying an upward pressure thereto for lifting the chucks when released from the control of the cams, and coil springs mounted on the standards above the upper plate and operating through said cams to hold the chucks with a yielding pressure against the caps.

HUGH T. GRISWOLD.